United States Patent [19]

Sato

[11] Patent Number: 5,356,090
[45] Date of Patent: Oct. 18, 1994

[54] BAITCASTING REEL HAVING CENTRIFUGAL BRAKE MECHANISM WITH IMPROVED ADJUSTING CONTROL

[75] Inventor: Jun Sato, Sakai, Japan

[73] Assignee: Shimano Inc., Osaka, Japan

[21] Appl. No.: 993,034

[22] Filed: Dec. 18, 1992

[30] Foreign Application Priority Data

Dec. 18, 1991 [JP] Japan .................. 3-104022[U]

[51] Int. Cl.⁵ ............................ A01K 89/0155
[52] U.S. Cl. ................... 242/289; 242/314; 188/185; 192/105 BA
[58] Field of Search ............ 242/289, 312, 314; 182/234, 239; 188/78, 135, 184, 185; 192/105 BA

[56] References Cited

U.S. PATENT DOCUMENTS

| | | | |
|---|---|---|---|
| 2,489,447 | 11/1949 | Borgstrom | 188/185 |
| 2,489,688 | 11/1949 | Vitoux | 188/185 |
| 2,581,555 | 1/1952 | Randick | 188/135 |
| 2,808,905 | 10/1957 | Bohl | 188/184 |
| 3,986,678 | 10/1976 | Coquelet et al. | |
| 4,119,188 | 10/1978 | Argereu | 188/185 X |
| 4,209,141 | 6/1980 | Karlsson | 188/185 X |
| 5,120,002 | 6/1992 | Kawai | 242/314 |

*Primary Examiner*—Daniel P. Stodola
*Assistant Examiner*—Michael R. Mansen
*Attorney, Agent, or Firm*—Dickstein, Shapiro & Morin

[57] ABSTRACT

A baitcasting reel comprising a reel body including right and left side frames disposed across a spool, a side case for covering an opening defined in one side face of one of the side frames, and a centrifugal brake mechanism including a brake shoe fixed to either one of the side frames and brake blocks mounted on a rotational drive line of the spool to act upon the brake shoe with rotation of the spool. The brake blocks are opposed to the brake shoe and movable between an operative position to contact the brake shoe and a rest position retracted from the brake shoe.

12 Claims, 7 Drawing Sheets

BAITCASTING REEL HAVING CENTRIFUGAL BRAKE MECHANISM WITH IMPROVED ADJUSTING CONTROL

BACKGROUND OF THE INVENTION

1. Field of the Invention

The present invention relates to baitcasting reels, and more particularly to a baitcasting reel comprising a reel body having right and left side frames mounted across a spool and a centrifugal brake mechanism including a brake shoe mounted on a fixed component, and brake blocks contacting the brake shoe.

2. Description of the Related Art

In conventional baitcasting reels of the above-noted type, the centrifugal brake mechanism acts upon the spool for preventing backlash. However, it is sometimes preferable not to cause the centrifugal brake mechanism to act on the spool depending on the size of a weight or the diameter of a fishing line. In some cases, the braking force is adjusted by moving part of a plurality of peripherally disposed brake blocks to a rest position. Thus, a baitcasting reel relating to the present invention has the brake blocks selectively maintained between an operative position to contact the brake shoe and a rest position away from the brake shoe.

One example of the reels as constructed above was proposed by the same applicants in Japanese Utility Model Application No. 3-46172 (specifically in FIG. 4) in which a side case is rigidly attached to the side frame for entirely covering one side of the side frame. A cutout portion is defined in part of the side case or side frame so that the angler can insert his or her finger into the cutout portion to change the position of the brake blocks. When the change operation is not carried out, a side wall of an upper cover for the spool closes the cutout portion of the side case.

With such a structure as described above, it is not required to attach and remove the side case from the side frame in order to adjust the brake blocks, which provides good operative efficiency. However, the size of the cutout portion is often limited to a part required only for controlling the brake blocks. Thus, to increase of the size of the cutout portion is disadvantageously limited if the strength of the side case per se is taken into consideration.

SUMMARY OF THE INVENTION

A primary object of the subject invention is to provide a baitcasting reel in which the brake blocks can be readily and quickly moved between the operative position and the rest position by improving the way of attachment of the side case to the side frame.

In order to fulfill the above-noted object, the baitcasting reel according to the present invention is characterized a reel body including right and left side frames disposed across a spool, a side case for covering an opening defined in one side face of one of the side frames, and a centrifugal brake mechanism including a brake shoe fixed to either one of the side frames and brake blocks mounted on a rotational drive line of the spool to act upon the brake shoe with rotation of the spool, said brake blocks being opposed to the brake shoe and movable between an operative position to contact the brake shoe and a rest position retracted from the brake shoe.

This structure has the following functions and effects.

The brake blocks can be visually perceived through the opening of the side frame only by removing the side case from the side frame, which enables the angler to switch the brake blocks between the operative position and the rest position without being obstructed by the side case.

Due to the structure that the side case covers the opening defined in one side face of the side frame and that the brake block is arranged to be visually perceived only by removing the side case from the side frame, a large space for adjusting the brake blocks can be secured around the brake blocks to facilitate the change operation of the brake blocks.

Further, according to the baitcasting reel of the present invention, the centrifugal brake mechanism may include a holder fixed to a spool shaft, support shafts extending radially and outwardly of the holder, brak blocks slidably fitted on the support shafts, retaining members disposed in the proximity of the brake blocks for maintaining the brake blocks in the rest position, and a brake shoe fixed to the right side frame to receive pressure contact from the brake blocks.

Spaces for housing the brake blocks are defined in portions to place the support shafts in the holder to surround the support shafts, and wherein upper and lower projections are defined on inner wall faces of the holder within each brake block housing space, said projections being engageable with a resilient engaging portion defined on each of the brake blocks.

The centrifugal brake mechanism maintains the brake blocks in the rest position by engaging the resilient engaging portions of the brake blocks with the lower projections, and maintains the brake blocks in the operative position by positioning the resilient engaging portions between the lower and upper projections.

This structure performs the following functions and effects.

When the resilient engaging portion of each brake block engages the lower projection, the brake block moves away from the brake shoe and is maintained in position under an engaging force therebetween. When the brake shoe is moved against the engaging force between the resilient engaging portion and the lower projection to position the resilient engaging portion between the lower projection and the upper projection, the brake block can act upon the brake shoe under a centrifugal force produced by rotation of the spool. It is sufficient to move the brake shoe in the opposite direction in order to restore the brake block from the operative position to the rest position.

Thus, the present invention provides a centrifugal brake mechanism utilizing the resilient engaging force between the inwardly directed projections and the resilient engaging portion to selectively maintain the brake block in the rest position and the operative positions, which mechanism can switch the brake block by a simple operation of moving the brake shoe with an operative force overriding the resilient engaging force between the resilient engaging portion and the projections. If the retaining member is provided for maintaining the brake block in the rest position, the upper projection for preventing the brake block from slipping out of position is not required.

A mechanism for attaching and removing said side case to/from said right side frame includes engaging pawls projecting inwardly of an inner edge of the side frame defining an opening for receiving the spool, an annular engaging recess defined in an inner plate of the side case positioned in the proximity of the spool and having a gradually reduced width to be engageable with the engaging pawls to restrict relative pivotal movement of the engaging pawls beyond a predetermined range to determine a relative lock position of the side case, and cutout portions defined in an outer wall of the engaging recess for the engaging pawls to pass therethrough to enter the engaging recess.

With such a construction, in order to attach the side case to the side frame, the side case is moved toward the engaging recess with the engaging pawls placed in phase with the cutout portions, whereby the engaging pawls enter the engaging recess. When the side case is rotated along the annular engaging recess, the engaging pawls are wedged into the reduced width portion of the engaging recess to complete the attachment. In order to remove the side case from the side frame, a reverse operation is carried out.

Thus, the side case is readily and quickly attachable and removable.

According to a further aspect of the present invention, the attachment/removal mechanism includes a mechanism for generating a click sound before the side case and the frame reach the relative lock position when the side case is attached to the side frame. The angler can perceive by the click sound that the engaging pawls reliably have reached the lock position when attaching the side case, which advantageously reduces the change of making an assembly error.

Further objects, features and advantages of the present invention will be apparent from the following description referring to the accompanying drawings.

BRIEF DESCRIPTION OF THE DRAWINGS

The drawings illustrate a baitcasting reel according to the present invention in which.

DETAILED DESCRIPTION OF THE PREFERRED EMBODIMENTS

A baitcasting reel embodying the present invention will be described in detail hereinafter referring to the drawings.

Figure 1:
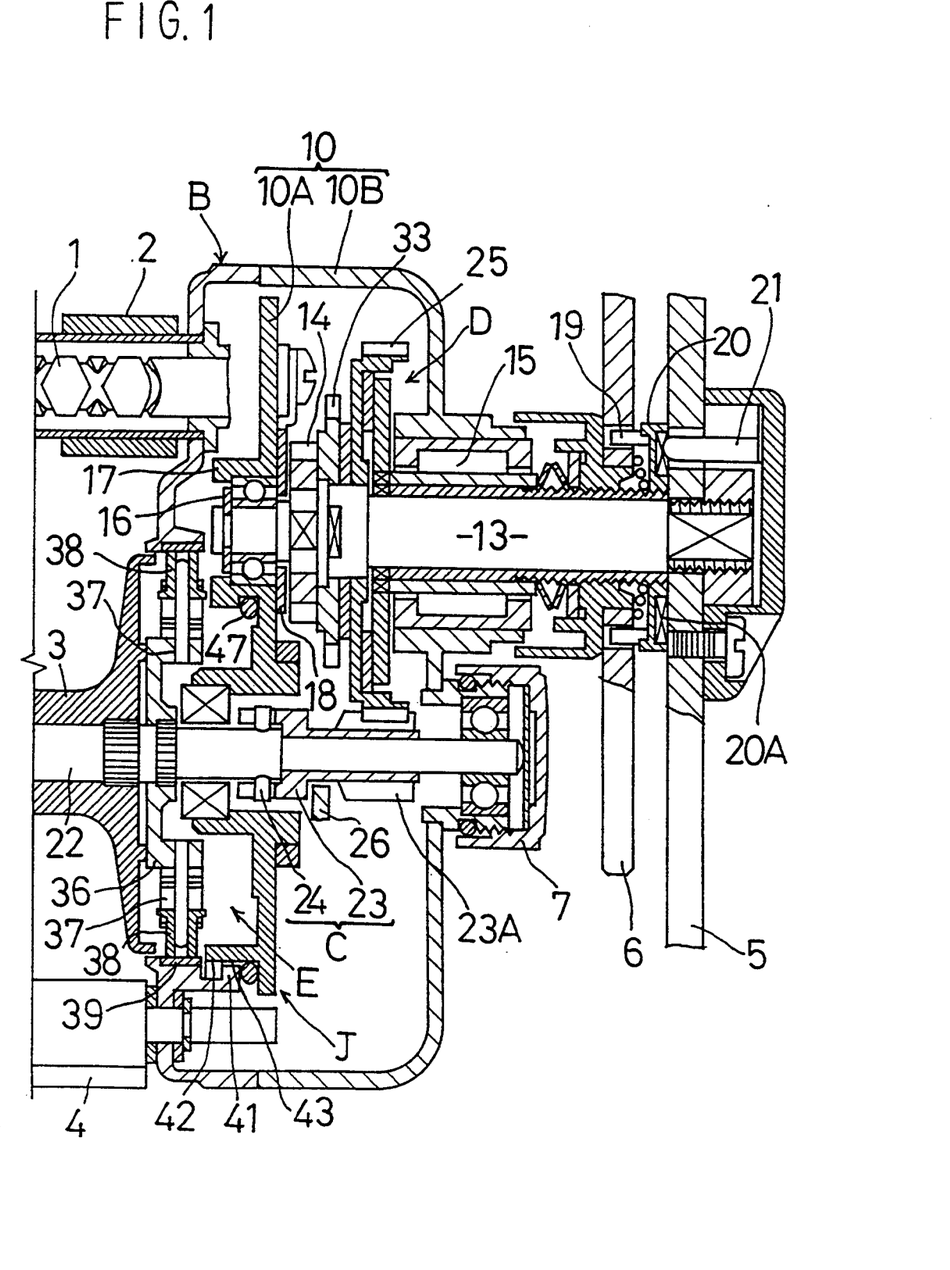
FIG. 1 is a plan view in cross section showing a right side body of the reel.
Figure 2:
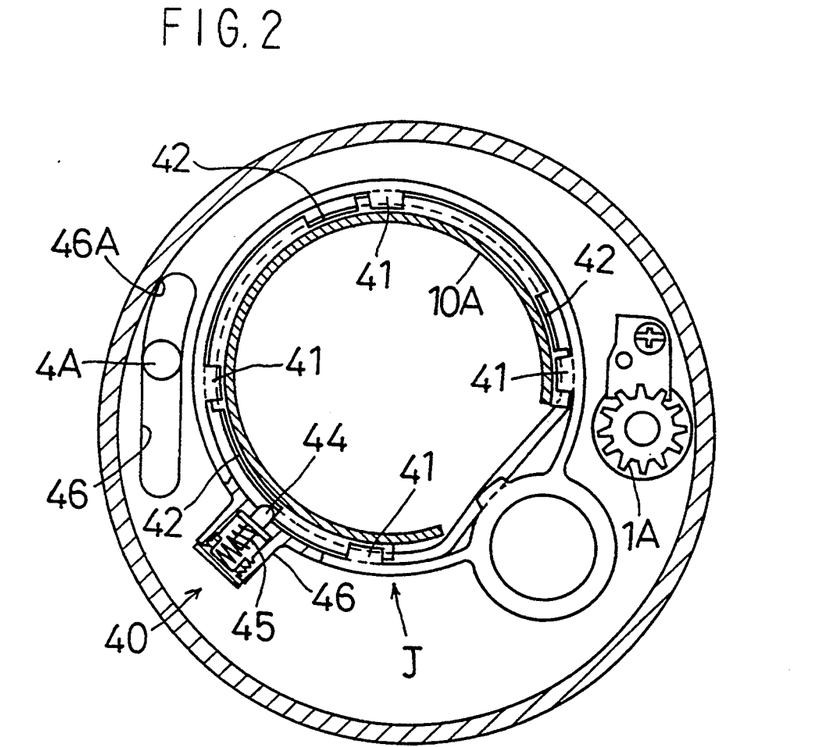
FIG. 2 is a side view in vertical section showing a right side case attached to a right side frame.

FIGS. 1 and 2 show a baitcasting reel comprising right and left side frames A and B, a level wind mechanism disposed in a forward portion between the side frames, a spool 3 disposed in a middle portion, and a clutch control member 4 disposed in a rear portion. The level wind mechanism includes a helical groove shaft 1 rotatable to reciprocate a line guide 2 right and left thereon. The right side frame B includes a side case 10 attached thereto and having a handle 15, a drag control element 6 and a cast controller 7, which side case will be described later.

This reel has a reel body including an upper thumb rest 8 disposed on upper positions of side frames A and B, and a pair of lower frames 9 disposed on lower positions thereof, which are formed integral by aluminum die casing. The right side frame B defines a rightward to the side case 10. A foot 11 extends between the lower frames 9.

As shown in FIG. 1, the side case 10 includes an inner plate 10A arranged in the proximity of the right side frame B, and a bowl-like outer case 10B screwed to the inner plate 10A. The inner plate 10A supports a handle shaft 13 having the handle 5 and drag control element 6. The handle shaft 13 includes a drag mechanism D and an output gear 14 mounted on an inner end portion thereof. The outer case 10B defines a boss portion through which the handle shaft 13 extends. The boss portion includes a roller type one-way clutch 15 acting on the handle shaft 13 to prevent reverse turning of the handle 5. Drive from the handle 5 is transmitted to an input gear 1A of the helical groove shaft 1 through the output gear 14 and an intermediate gear 14A.

On the inner end portion of the handle shaft 13 is also disposed a bearing 17 retained by a stop ring 16. The handle shaft 13 is supported by the inner plate 10A through a retainer 18 for preventing the bearing 17 from falling off the handle shaft 18. A disk 20 is mounted on a surface of the drag control element 6 opposed to the handle 5 to be rotatable with the drag control element through a pin 19, while the handle 5 includes an engaging pin 21 engageable with a rugged surface 20A defined on the disk 20. An operating amount of the drag control element 6 can be detected through a click sound produced by the engaging pin 21 snapped on the rugged surface 20A.

A clutch mechanism C includes a clutch sleeve 23 slidably fitted on a spool shaft 22 and a pin 24 formed on the spool shaft 22 to be engageable with the clutch sleeve 23. An input gear 23A of the clutch sleeve 23 is meshed with an output gear 25 of the drag mechanism D, thereby to transmit an rotational operative force from the handle 5 to the spool 3 through the drag mechanism D and the clutch mechanism C to establish a transmission line extending from the handle 5 to the spool 3.

Figure 5:
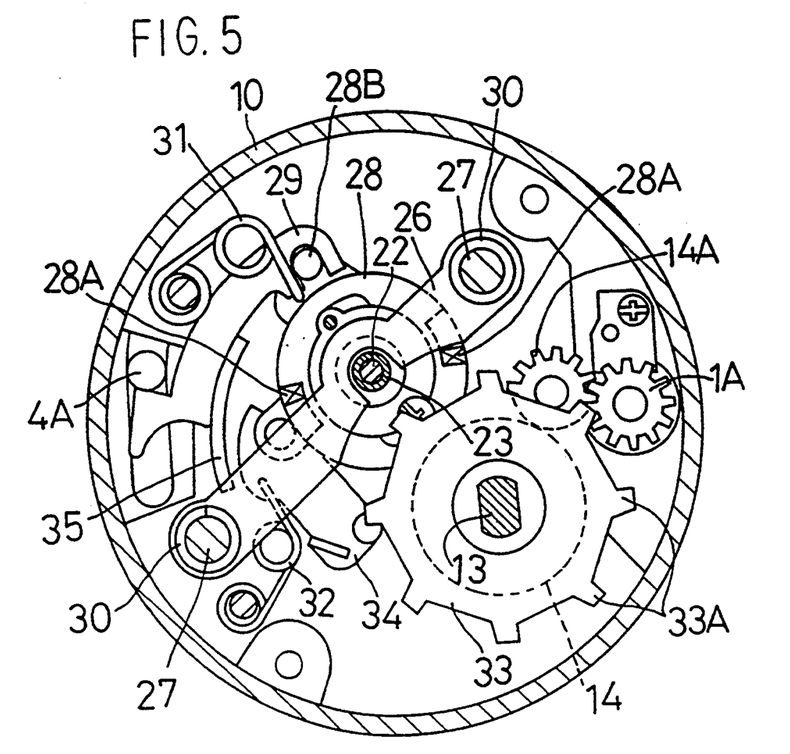
FIG. 5 is a side view in vertical section showing an internal structure of the right side case.
Figure 6:
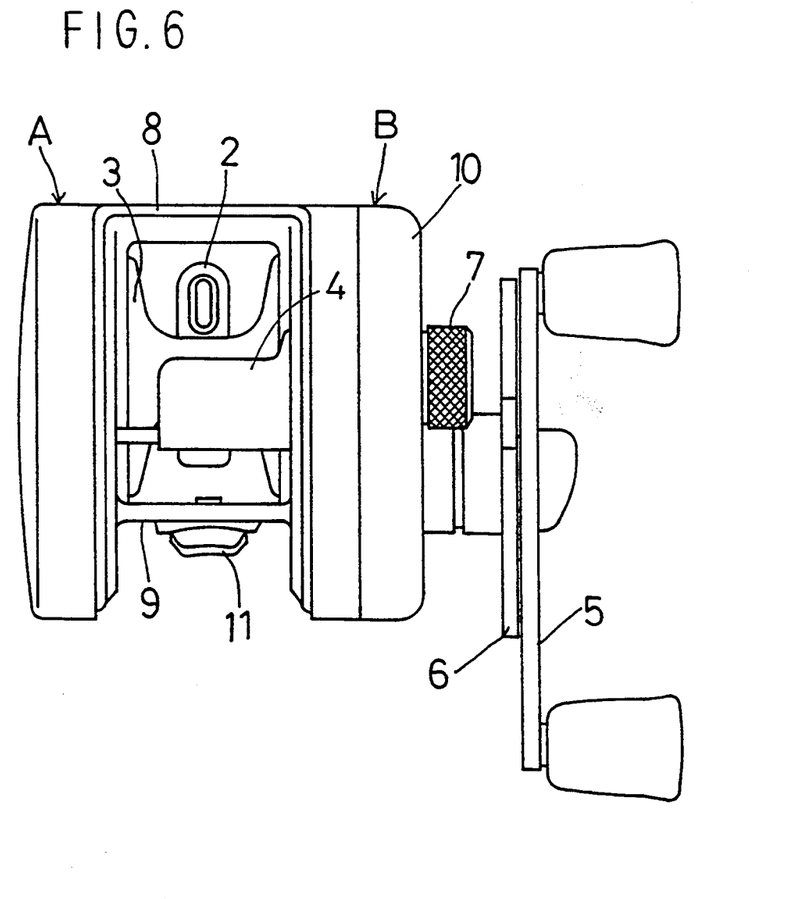
FIG. 6 is a rear view of the reel.

As seen from FIG. 5, a shifter 26 engages the clutch sleeve 23 and is slidably supported by a pair of support shafts 27. The shifter 26 is contactable by a pair of cam faces 28A of a rotary cam 28 rotatable coaxially with the spool 3 to operate the clutch sleeve 23. A link member 29 contacting a control pin 4A of the clutch control member 4 engages an engaging pin 28B of the rotary cam 28.

Compression springs 30 are fitted on the support shafts 27 for moving the shifter 26 to a position to engage the clutch mechanism C. A toggle spring 31 acts on the rotary cam 28 for maintaining the rotary cam 28 in the position to engage or a position to disengage the clutch mechanism C. A return arm 34 is provided for moving an end portion of a further toggle spring 32 to a position to interfere with a return control wheel 33 under an urging force of the toggle spring 32 when the clutch mechanism C is set to the disengaged position.

In order to disengage the clutch mechanism C, the clutch control member 4 is pressed down. Then, the link member 29 receives an operating force from the pin 4A defined on the clutch control member 4 to move in an arc along a guide member 35 to rotate the rotary cam 28. As a result, the cam faces 28A press the shifter 26 to move the clutch sleeve 23 toward the declutching position. Conversely, in order to engage the clutch mechanism C, the handle 5 is turned in a direction to wind a fishing line. The rotary cam 28 is moved toward the clutching position through the return arm 34 under a pressing force from teeth 33A defined on the wheel 33, thereby to operate the shifter 26 under the urging force of the compression springs 30 to engage the clutch mechanism C.

Figure 4:
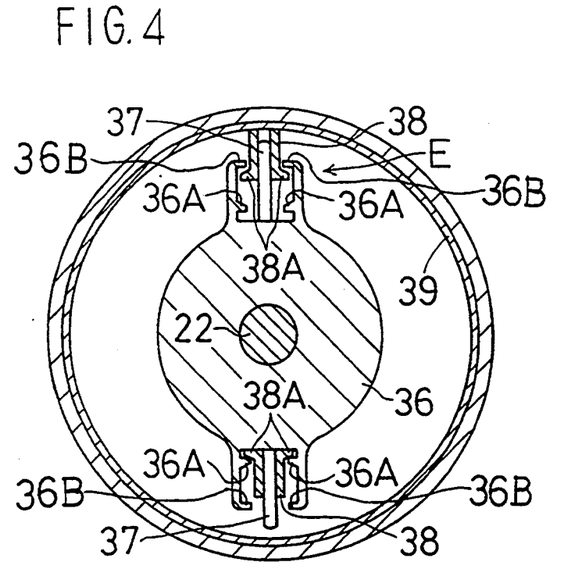
FIG. 4 is a side view in vertical section showing a centrifugal brake mechanism.

FIGS. 1 and 4 show a centrifugal brake mechanism E mounted inside the right side case B and including a holder 36 fixed to the spool shaft 22, support shafts 37 extending radially of the holder 36 and opposed to each other by 180°, brake blocks 38 slidably fitted on the support shafts 37, and an annular brake shoe 39 fixed to the right side frame B outwardly of a locus of revolution of the brake blocks 38. The holder 36 defines spaces for accommodating the brake blocks 38. Inwardly directed projections 36A and 36B are defined one above the other on an inner wall of each space. At a lower end of each brake block 38 is defined an outwardly directed resilient engaging portion 38A engageable with the lower projection 36A to maintain the brake block 38 in a rest position away from the brake shoe 39. On the other hand, when the resilient engaging portion is positioned between the upper and lower projections 36A and 36B, the brake block 38 is prevented from slipping out of the support shaft 37 and at the same time is placed in an operative position to act upon the brake shoe under a centrifugal force caused by rotation of the spool 3.

Figure 3:
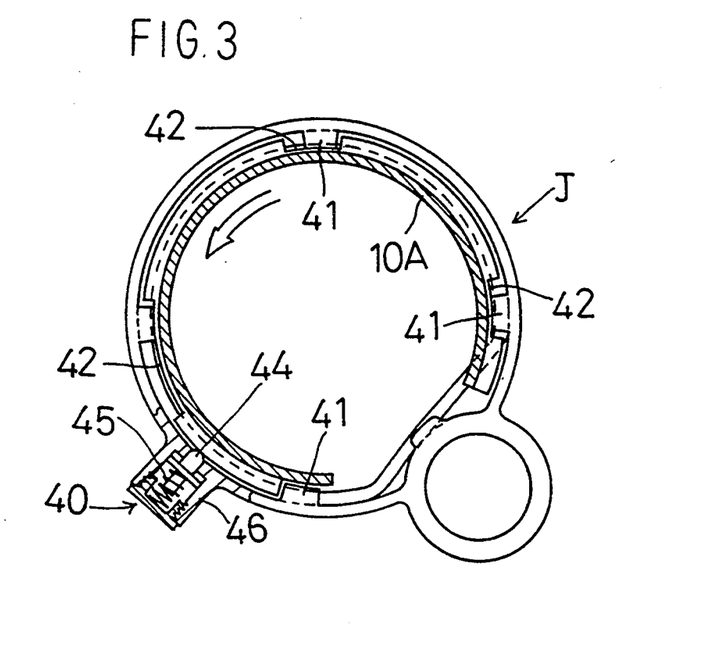
FIG. 3 is a side view in vertical section showing cutout portions of an engaging recess defined in the right side case being in phase with engaging pawls defined on the side frame.

As shown in FIGS. 1 and 3, the side case 10 including the inner plate 10A and the outer plate 10B is rotatable about an axis of the spool 3. The reel further comprises a mechanism J for attaching and removing the side case 10 to/from the right side frame B by rotation of the side case.

More particularly, the attachment/removal mechanism J includes engaging pawls 41 projecting inwardly of an inner edge of the side frame B defining an opening for receiving the spool, an engaging recess 43 defined in a side wall of the inner plate 10A in the proximity of the spool, and cutout portions 42 defined in outer walls of the engaging recess 43. This structure is commonly called a bayonet. The engaging recess 43 is in the form of an annular groove having a gradually reduced width for engaging the engaging pawls 41 to prevent movement relative thereto of the engaging pawls 41 beyond a predetermined range and to determine a lock position of the side case 10B. The cutout portions 42 allow the engaging pawls 41 to pass therethrough to enter the engaging recess 43. Numeral 47 denotes an anti-slack O-ring for reinforcing the engagement between the engaging pawls 41 and the engaging recess 43. In order to remove the side case 10 from the right side frame B, the angler grips the side case 10 together with the handle 5 with one hand and grips the right side frame B together with the left side frame A with the other hand to rotate them relative to each other about the axis of the spool. As a result, the engagement between the engaging recess 43 and the engaging pawls 41 is released to allow the side case 10 to be removed. When the side case 10 is attached, a reverse operation causes the side case 10 to reach the predetermined relative lock position. A mechanism 40 for producing a click sound before the side case reaches the relative lock position is also provided. This mechanism 40 includes a sound producing piece 44 cooperating with the engaging pawls 41 projecting inwardly of the side frame B defining the opening for receiving the spool. The sound producing piece 44 is housed with an urging spring 45 in a holder 46 mounted outwardly of the engaging recess 43 of the inner plate 10A. The sound producing piece 44 is retracted by relative pivotal movement of the engaging pawls 41 entering the engaging recess 43, and produces a click sound immediately before the engaging pawls 41 having passed through the sound producing piece 44 are locked in the engaging recess 43.

An operation for removing the side case is effected by turning the side case 10 clockwise; i.e. rightwardly viewed from the handle. A slot 46 through which the control pin 4A of the clutch control member 4 extends has an upwardly directed passage 46A for effecting a smooth removing operation. The input gear 1A of the helical groove shaft 1 is meshed with the intermediate gear 14A on a line extending from the output gear 14 to the intermediate gear 14A.

According to the structure as noted above, the centrifugal brake mechanism E is exposed when the side case 10 is removed from the right side frame B, and the angler can easily change the positions of the brake blocks 38 with his or her fingers supporting the reel.

Other embodiments will be described below.

(1) The centrifugal brake mechanism E may be accommodated in the side frame A not having the handle, and the side case 10 may detachably cover the whole outer surface of the side frame A.

(2) The side case 10B may be attachable and removable through bolts.

Figure 7:
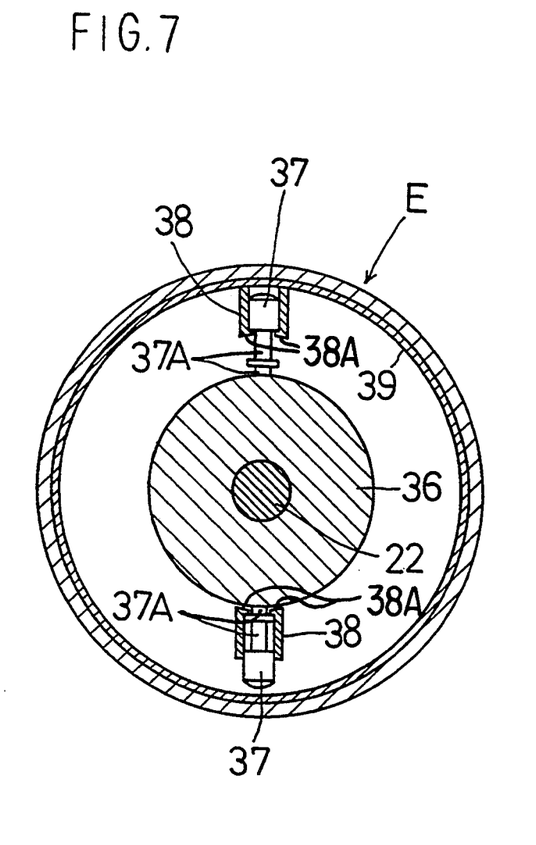
FIG. 7 is a side view in vertical section showing another mode of the centrifugal brake mechanism.

(3) As shown in FIG. 7, the mechanism for selectively maintaining the brake blocks 38 in the operative position and in the rest position may include a plurality of small diameter portions 37A defined in axially intermediate positions of the support shafts 37, and engage the resilient engaging portions of the brake blocks 38 with the small diameter portions 38A positioned closer to the axis of the spool thereby to maintain the brake blocks 38 in the rest position while engaging the resilient engaging portions of the brake blocks with the small diameter portions 37A positioned away from the axis of the spool thereby to maintain the blocks in the operative position.

Figure 8:
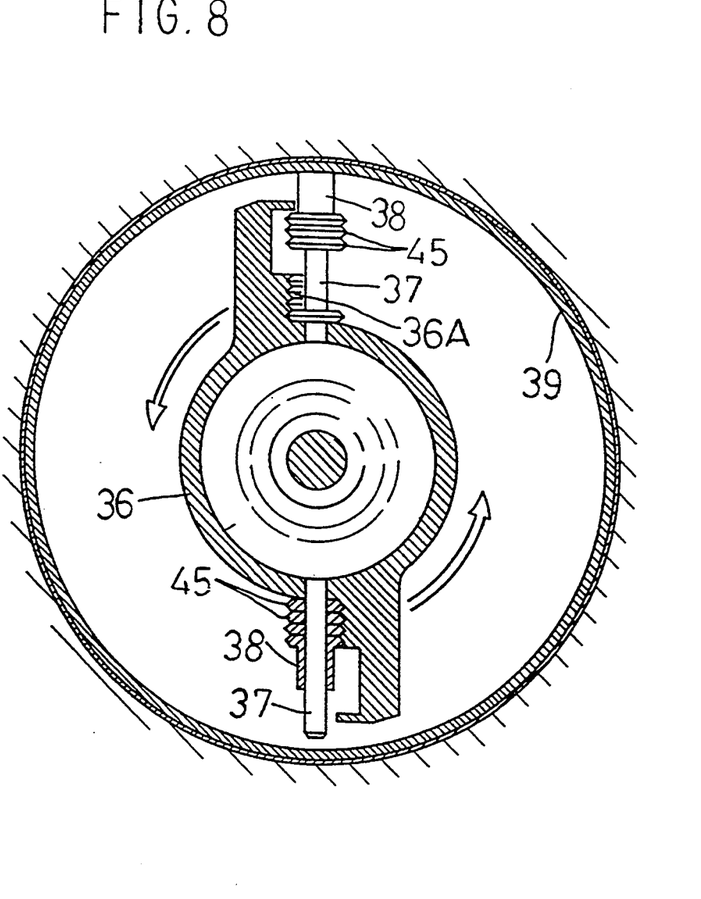
FIG. 8 is a side view in vertical section showing a further mode of the centrifugal brake mechanism.

(4) As shown in FIG. 8, the holder 36 forming part of the centrifugal brake mechanism E may surround each brake block 38 through 180°, instead of the entire periphery thereof. Consequently, the inwardly directed projection 36A acts upon the brake block 38 from only one side of each block. Numeral 45 denotes auxiliary brake blocks.

Figure 9:
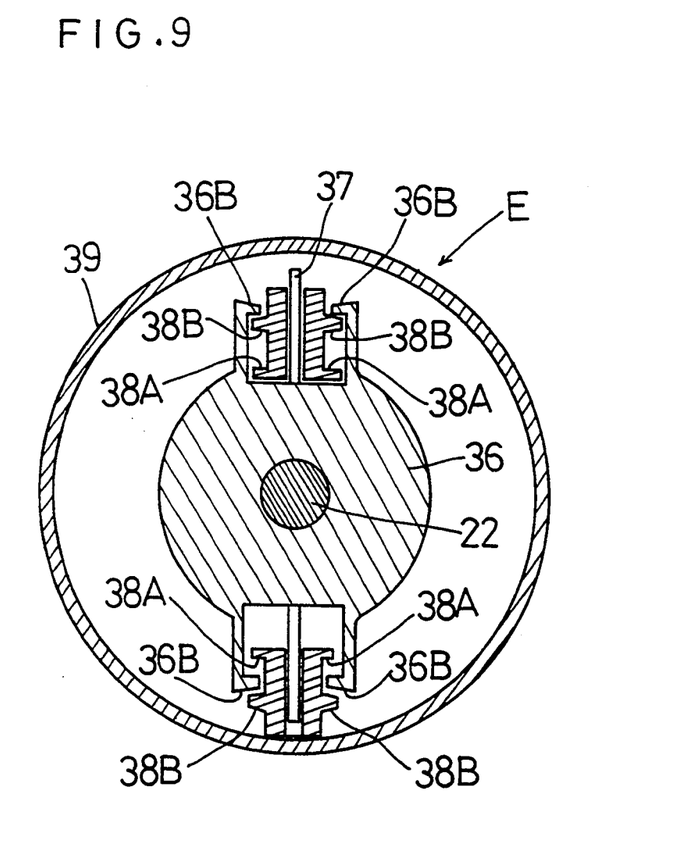
FIG. 9 is a side view in vertical section showing a still further mode of the centrifugal brake mechanism.

(5) FIG. 9 shows a further modification of the centrifugal brake mechanism E. As illustrated, upper and lower projections 38B and 38A are provided to act as resilient engaging portions of each brake block 38, and an upper projection 36B is defined in the holder 36 within each brake block housing space. The upper projection 38B of the brake block 38 is positioned inwardly of the upper projection 36B thereby to maintain the brake block 38 in the rest position. On the other hand, when the upper projection 36B defined in the holder is positioned between the upper and lower projections 38B and 38A to cause the brake block 38 to project, the brake block 38 is switched to the operative position.

What is claimed is:

1. A baitcasting reel comprising:
   a reel body including first and second side frames respectively disposed on axially opposite sides of a spool;
   a side case for covering an opening defined in one side face of said first side frame;
   an attachment/removal mechanism including an engaging means disposed along a periphery of a spool-receiving opening defined in said first side frame and a further engaging means provided to said side case, said mechanism being operable to attach and remove said side case to and from said first side frame by rotating said side case about an axis normal to said side case; and
   a centrifugal brake mechanism including:
   a brake shoe fixed to said first side frame;
   a plurality of brake blocks mounted on a rotational drive line of said spool to act upon said brake shoe in response to rotation of said spool, said brake blocks being opposed to said brake shoe and movable between an operative position to contact said brake shoe and a rest position retracted from said brake shoe; and
   retaining means for selectively retaining at least one of said brake blocks in said rest position;
   wherein said attachment/removal mechanism allows said brake blocks to be accessible when said mechanism is operated to remove said side case from said first side frame.

2. A baitcasting reel as claimed in claim 1, wherein said brake blocks are arranged between a flange defined on an axial end portion of said spool and a bearing of said spool.

3. A baitcasting reel as claimed in claim 1, wherein said centrifugal brake mechanism includes a holder fixed to a spool shaft, support shafts extending radially and outwardly of said holder, wherein said brake blocks are slidably fitted on said support shafts, retaining members disposed in the proximity of said brake blocks for maintaining the brake blocks in said rest position, and wherein said brake shoe is fixed to a periphery of said spool-receiving opening to receive pressure contact from said brake blocks.

4. A baitcasting reel as claimed in claim 3, wherein each of said retaining members is disposed in said holder in a position adjacent an axis of rotation of said brake blocks housing space.

5. A baitcasting reel as claimed in claim 3, wherein spaces for housing said brake blocks are defined in portions to place said support shafts in said holder to surround the support shafts, and wherein upper and lower projections are defined on inner wall faces of said holder within each brake block housing space, said projections being engageable with a resilient engaging portion defined on each of said brake blocks.

6. A baitcasting reel as claimed in claim 5, wherein said centrifugal brake mechanism maintains said brake blocks in the rest position by engaging said resilient engaging portions of the brake blocks with said lower projections, and maintains said brake blocks in the operative position by positioning said resilient engaging portions between said lower and upper projections.

7. A baitcasting reel as claimed in claim 1, wherein said attachment/removal mechanism includes a mechanism for generating a click sound before said side case and said first side frame reach a relative lock position when the side case is attached to the first side frame.

8. A baitcasting reel as claimed in claim 7, wherein said mechanism for generating a click sound includes a sound producing piece housed in said holder of the side case, and engaging pawls acting on said sound producing piece when engaged with said engaging recess to follow relative pivotal movement.

9. A baitcasting reel as claimed in claim 1, wherein said centrifugal brake mechanism includes a lower small diameter portion and an upper small diameter portion spaced apart in an axial direction of each of said support shafts, said centrifugal brake mechanism maintaining said brake blocks in the rest position by positioning a resilient engaging portion of each brake block within the lower small diameter portion while maintaining said brake block in the operative position by positioning said resilient engaging portion within the upper small diameter portion.

10. A baitcasting as claimed in claim 1, wherein said centrifugal brake mechanism includes upper and lower resilient engaging portions defined on each of the brake blocks, and an upper resilient engaging portion defined in said holder at an exit portion of each brake block housing space, wherein said upper resilient engaging portion of each brake block is engaged with said upper resilient engaging portion of said holder thereby to maintain the brake block in the rest position while said upper resilient engaging portion of the holder is positioned between the upper and lower resilient engaging portions of the brake block to cause the brake block to project thereby to move the brake block to the operative position.

11. A baitcasting reel as claimed in claim 1, wherein said attachment/removable mechanism includes engaging pawls projecting inwardly of an inner edge of said spool-receiving opening, an annular engaging recess defined in an inner plate of said side case and having a gradually reduced width to be engageable with said engaging pawls to restrict relative pivotal movement of the engaging pawls beyond a predetermined range to determine a relative lock position of said side case, and cutout portions defined in an outer wall of said engaging recess for allowing said engaging pawls to pass therethrough to enter said engaging recess.

12. A baitcasting reel comprising:
   a reel body having a circular configuration and including first and second side frames;
   a spool disposed between said first and second side frames and having an axis of rotation displaced from a center of said circular reel body;
   a side case for covering an opening defined in one side face of said first side frame;
   a handle shaft supported to said side case;
   an attachment/removal mechanism including an engaging means disposed along a periphery of a spool-receiving opening defined in said first side frame, and a further engaging means provided to said side case, said mechanism being operable to attach and remove said side case to and from said first side frame by rotating said entire side case about an axis of said spool;
   a click-sound generating mechanism disposed between said side case and said first side frame, said mechanism being operable to generate a click sound before said side case reaches a lock position; and
   a centrifugal brake mechanism including:
   a brake shoe fixed to said first side frame, a plurality of brake blocks mounted on a rotational drive line of the spool to act upon said brake shoe in response to rotation of the spool, said brake blocks being opposed to said brake shoe and movable between an operative position to contact said brake shoe and a rest position retracted from said brake shoe; and retaining means for selectively retaining at least one of said brake blocks in said rest position;

wherein said displacement between said rotation axis of the side case and the center of the reel body facilitates a pivotal operation of said side case for removal of this entire side case thereby to facilitate a switching operation of said brake blocks between said operative position and said rest position.

* * * * *